(12) United States Patent
Fukuda et al.

(10) Patent No.: US 7,021,144 B2
(45) Date of Patent: Apr. 4, 2006

(54) ULTRASONIC WAVE UTILIZING DEVICE

(75) Inventors: Akiharu Fukuda, Hyogo (JP); Takashi Ohsawa, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/684,659

(22) Filed: Oct. 15, 2003

(65) Prior Publication Data
US 2004/0168518 A1 Sep. 2, 2004

(30) Foreign Application Priority Data
Oct. 28, 2002 (JP) .............................. 2002-313143

(51) Int. Cl.
*G01N 29/00* (2006.01)

(52) U.S. Cl. .......................................... 73/632; 73/649

(58) Field of Classification Search .................. 73/632, 73/598, 432.1, 579, 602, 627, 649

See application file for complete search history.

(56) References Cited

U.S. PATENT DOCUMENTS

| | | | | |
|---|---|---|---|---|
| 4,712,428 A | * | 12/1987 | Ishii et al. | ...................... 73/644 |
| 4,722,547 A | | 2/1988 | Kishi et al. | |
| 4,796,726 A | | 1/1989 | Kobayashi et al. | |
| 5,021,701 A | * | 6/1991 | Takahashi et al. | .......... 310/345 |
| 5,118,914 A | * | 6/1992 | Girardin et al. | .......... 219/69.11 |
| 6,085,592 A | | 7/2000 | Kawashima | |
| 6,484,581 B1 | * | 11/2002 | Nishimoto et al. | ........... 73/579 |

FOREIGN PATENT DOCUMENTS

| | | |
|---|---|---|
| JP | 62-41147 B | 4/1983 |
| JP | 10-332817 A | 12/1998 |

* cited by examiner

*Primary Examiner*—Hezron Williams
*Assistant Examiner*—Jacques M Saint-Surin
(74) *Attorney, Agent, or Firm*—Sughrue Mion, PLLC

(57) ABSTRACT

In an ultrasonic wave utilizing device having a cylindrical elastic holder 2 into which an ultrasonic sensor 3 is pressed and a cylindrical part 23 that is closed at one end and is formed in a case 1 in such a way as to have this elastic holder 2 assembled therein, the elastic holder 2 has an elastic end wall 33 formed at an end of pressing side, a first elastic retaining part 35 for retaining the outside end edge of the cylinder part of the pressed-into ultrasonic sensor 3, and a second elastic retaining part 36, 37.

6 Claims, 3 Drawing Sheets

ULTRASONIC WAVE UTILIZING DEVICE

BACKGROUND OF THE INVENTION

1. Field of the Invention

This invention relates to an ultrasonic wave utilizing device which is any one of an ultrasonic wave transmitting device, an ultrasonic wave receiving device and an ultrasonic wave transmitting/receiving device provided with the ultrasonic wave transmitting device and the ultrasonic wave receiving apparatus, all of which can be used for an obstacle detecting apparatus, a backside monitoring apparatus, a tilt angle measuring apparatus and the like for a vehicle.

2. Description of the Related Art

In the related art, the ultrasonic sensor of an obstacle detecting apparatus for a vehicle, for example, is composed of an ultrasonic vibrator and a processing circuit that applies a driving voltage for making the ultrasonic vibrator to generate an ultrasonic wave, and processes a voltage which is generated by a piezoelectric effect of the ultrasonic vibrator, and the ultrasonic vibrator and the processing circuit are assembled in a case formed of resin. In the case, a vibration preventing member (silicon rubber) is provided around the ultrasonic vibrator, which prevents a direct vibration transmitted from the ultrasonic vibrator to the case. Moreover, a silicon resin is filled into the rear portion of the processing circuit, which prevents moisture. The processing circuit is connected to a controller via a harness and an operation for obstacle detection at a black or corners of the vehicle is performed by this controller. The case has a circular opening face, and the ultrasonic vibrator and the vibration preventing member are inserted into the case from the opening face side and assembled in the case (see, for example, patent document 1: Japanese Unexamined Patent Publication No. 10-332817, page 3 , 3rd column, 45th line–4th column, 12th line, and FIG. 3).

Moreover, the ultrasonic wave generating device of a backside monitoring-apparatus for a vehicle is composed of a main body in which an ultrasonic wave generating element is wrapped by a layer of synthetic resin material and a horn which is opened to the backside of the vehicle. The horn has a conical thin wall which is integrated with the synthetic resin material layer of the main body and the ultrasonic wave generating element is disposed in the backmost portion of an ultrasonic wave emitting hole formed in this conical thin wall. The main body, the horn, and the outer peripheral surface of an annular flange part which is formed integrally with the tip portion of the horn, are covered with a film made of rubber material to prevent leakage of the ultrasonic wave (see, for example, patent document 2: Japanese Examined Patent Publication No. 62-41147, page 2, 3rd column, 6th–13th line and 32nd–35th line, and FIG. 3).

In the obstacle detecting apparatus for a vehicle in the related art, the ultrasonic vibrator and the vibration preventing member are only inserted from its opening surface side. Thus, in an occasion where a vibration face of this device is faced in a horizontal direction when this device is used for detecting obstacles and for monitoring a backside, there is presented no problem. However, in an occasion where its vibration face is faced downward when it is used for measuring a tilt angle, there is some worry that the ultrasonic vibrator and the vibration preventing member may drop from the case.

Further, in the backside monitoring apparatus for a vehicle in the related art, the ultrasonic wave generating element is wrapped by the synthetic resin material layer of the main body. Thus, even if the vibration face is faced downward, ultrasonic wave generating element does not drop from the synthetic resin material layer, but a work of forming the synthetic resin material layer around the ultrasonic wave generating element is required. Moreover, since the main body, the horn, and the outer peripheral surface of the annular flange part are covered with a film, a work of forming the film around the main body, the horn, and the outer peripheral surface of the annular flange, part is also required. Therefore, the backside monitoring apparatus for a vehicle presents a problem that it cannot be easily assembled.

SUMMARY OF THE INVENTION

The present invention has been made to solve the above mentioned problems. It is an object of the invention to provide an ultrasonic wave utilizing device in which an ultrasonic sensor can be easily mounted in a case and at the same time in which the ultrasonic sensor can be surely held at a predetermined position even when its vibration face is faced downward.

An ultrasonic wave utilizing device in accordance with the present invention, includes a cylindrical elastic holder into which an ultrasonic sensor is pressed and a cylindrical part that is closed at one end and is formed in a case in such a way as to have the elastic holder assembled therein and the ultrasonic wave utilizing device is characterized by that the elastic holder has an elastic end wall formed at an end of pressing side and a first elastic retaining part for retaining an outside end edge of the ultrasonic sensor which is pressed into the elastic holder, and in addition the elastic holder has a second elastic retaining part that is protruded outside from a hole made in a bottom of the cylindrical part and is retained by this hole.

As described above, according to the present invention, the elastic holder has the elastic end wall formed at the pressing side end, the first elastic retaining part for retaining the outside end edge of the pressed into ultrasonic sensor, and in addition the second retaining part, so that it is possible to eliminate a need for performing a forming work required in the related art and hence to easily mount the ultrasonic sensor and the elastic holder in the case. Moreover, even when vibrating face of the sensor is faced downward, it is possible to surely hold the ultrasonic sensor and the elastic holder at a predetermined positions and hence to easily be applied also to a tilt angle measuring apparatus.

DETAILED DESCRIPTION OF THE PREFERRED EMBODIMENTS

Embodiment 1

Figure 1:
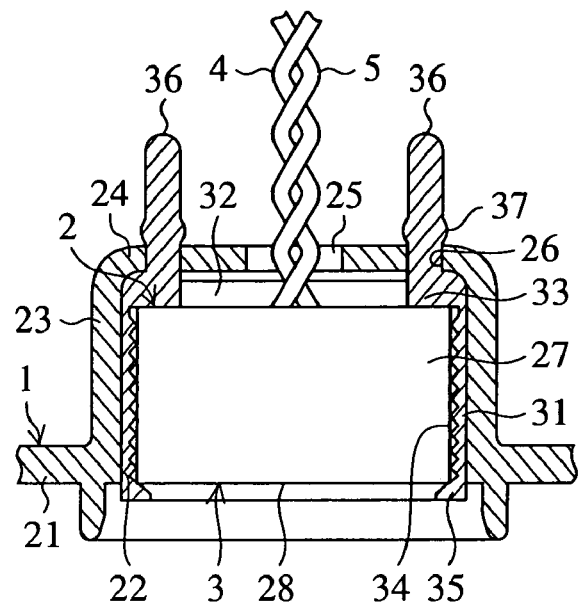
FIG. 1 is a cross sectional view to show relevant part of a tilt angle measuring apparatus in accordance with embodiment 1 of the present invention.
Figure 2:
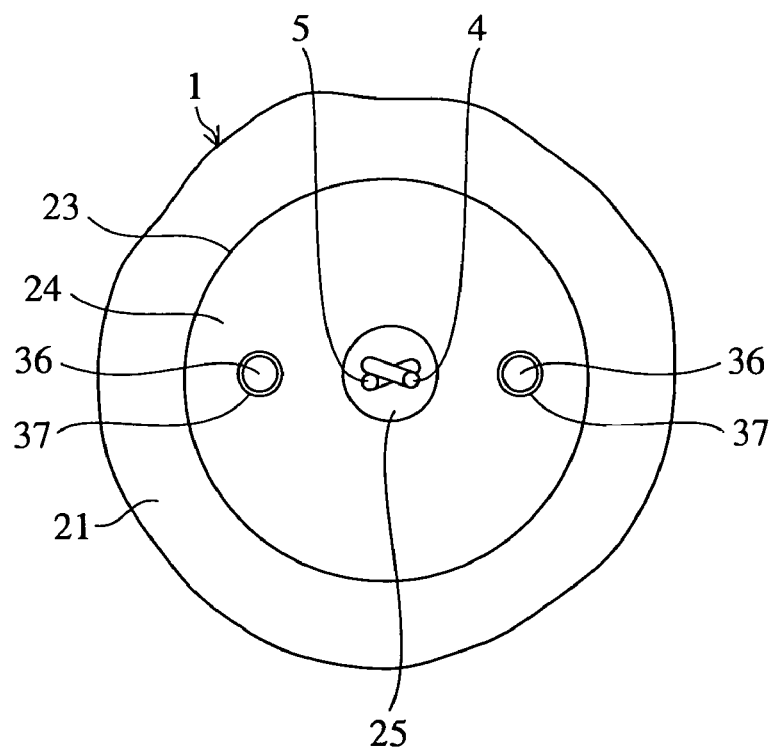
FIG. 2 is a plan view of the tilt angle measuring apparatus of FIG. 1.
Figure 3:
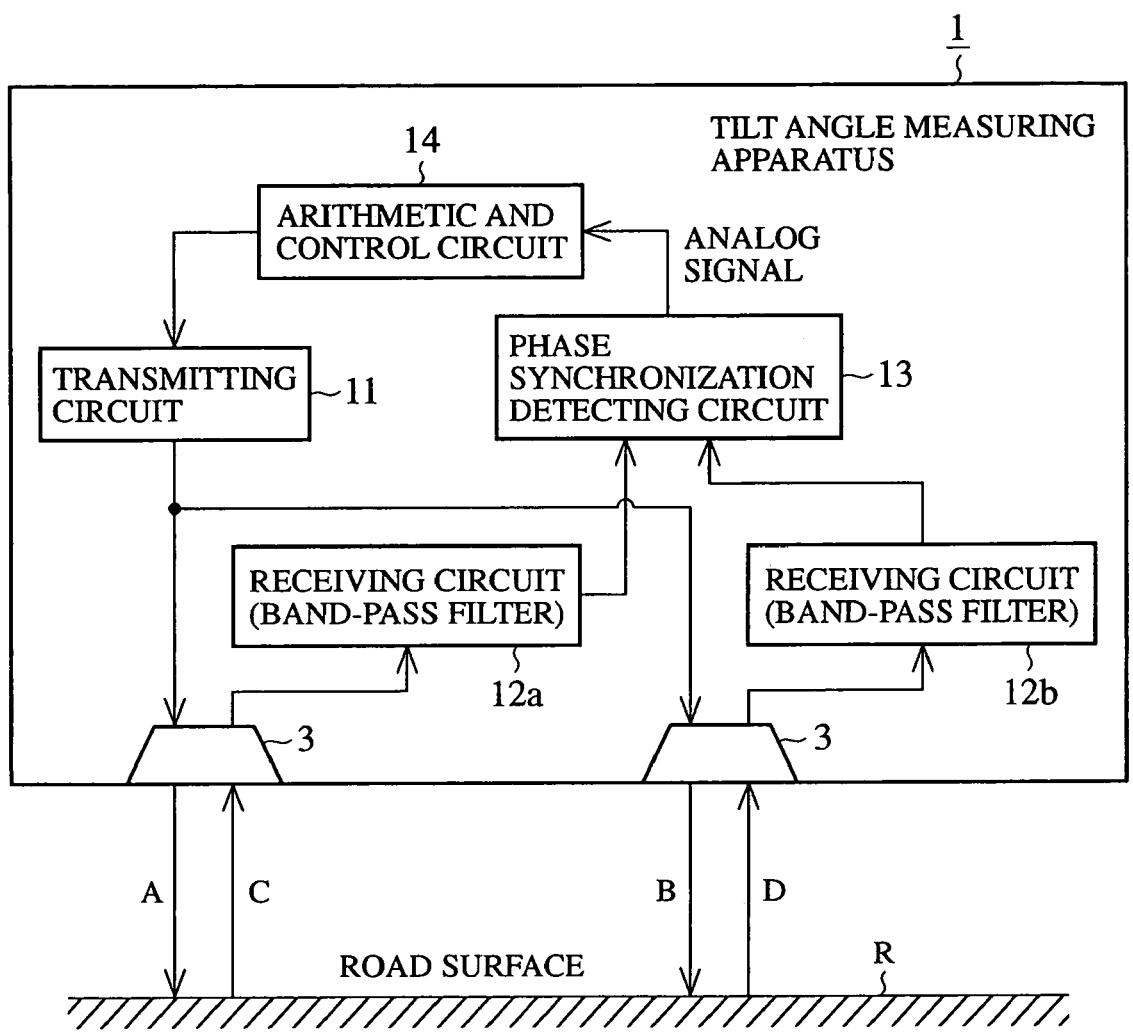
FIG. 3 is a block diagram of the tilt angle measuring apparatus.

FIG. 1 is a cross sectional view to show relevant part of a tilt angle measuring apparatus in accordance with embodiment 1 of the present invention. FIG. 2 is a plan view of the tilt angle measuring apparatus of FIG. 1. FIG. 3 is a block diagram of the tilt angle measuring apparatus. In the drawings, the tilt angle measuring apparatus has a case 1 that is fixed to the bottom of a vehicle body, an ultrasonic sensor 3 is held by the case 1 via an elastic holder 2. In this tilt angle measuring apparatus, a pair of ultrasonic sensors 3 are arranged in a back-and-forth direction at a predetermined interval and the ultrasonic sensors 3 are connected to a circuit board (not shown) via leads 4, 5, respectively.

The circuit board is provided with a transmitting circuit 11 that generates pulses of a predetermined frequency and supplies them to each of the ultrasonic sensors 3, receiving circuits (band-pass filters) 12a, 12b each of which extracts a specific frequency component from an electric signal of the pulses of a frequency that is received by each of the ultrasonic sensors 3 to be converted, a phase synchronization detecting circuit 13 that compares received waveforms extracted from these receiving circuits 12a, 12b and generates a phase difference signal between them, and an arithmetic and control circuit 14 that computes an angle of tilt of the vehicle with respect to a road surface R according to the phase difference signal and controls the whole tilt angle measuring apparatus.

The case 1 is formed of synthetic resin or the like and has a bottom plate 21 which is facing to the road surface R. In this bottom plate 21 are formed circular windows 22 the number of which is corresponding to a number of ultrasonic sensors 3 and through which the elastic holder 2 and the ultrasonic sensor 3 are passed, respectively. A cylindrical part 23 that houses the elastic holder 2 and the ultrasonic sensor 3, is formed on a top surface of the bottom plate 21 in such a way that it has an inside diameter equal to the inside diameter of the window 22 and contacts the elastic holder 2. An inside end of the cylindrical part 23 of the case 1 is closed by a bottom wall 24 that regulates a position of the elastic holder 2. In the bottom wall 24 are formed a through hole 25 which makes possible to pass the leads 4, 5 and two suspending holes 26 for suspending the elastic holder 2. The through hole 25 is formed at a center of the bottom wall 24 and the suspending holes 26 are formed symmetrically with respect to an axis across the through hole 25.

Each of the ultrasonic sensors 3 has a cylinder part 27 at which it is held by the elastic holder 2 and it is built in the cylindrical part 23 of the case 1 and the outside end of the cylinder part 27 is closed by a vibrating part 28. A piezoelectric element (not shown) is secured to the inner surface of the vibrating part 28 and one lead 4 is connected to the piezoelectric element and the other lead 5 is connected to the cylinder part 27. At this point, when the piezoelectric element have a voltage applied thereto, it is vibrated by an inverse piezoelectric effect to generate an ultrasonic wave, and when the piezoelectric element receives an ultrasonic wave reflected by the road surface R, it generates a voltage by a piezoelectric effect.

Figure 4:
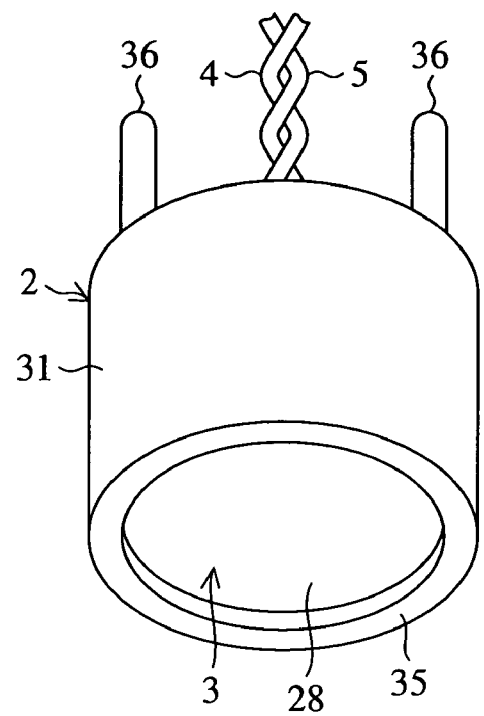
FIG. 4 is a perspective view to show an elastic holder that holds an ultrasonic sensor when viewed obliquely from below.
Figure 5:
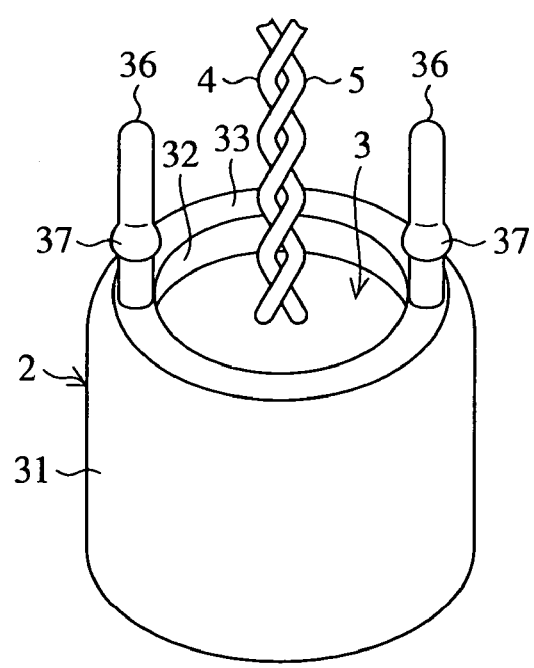
FIG. 5 is a perspective view to show an elastic holder that holds an ultrasonic sensor when viewed obliquely from above.

FIG. 4 is a perspective view to show the elastic holder 2 that holds the ultrasonic sensor 3 when viewed obliquely from below. FIG. 5 is a perspective view to show the elastic holder 2 that holds the ultrasonic sensor 3 when viewed obliquely from above. The elastic holder 2 is formed of rubber or the like and is adapted to prevent the direct transmission of vibration of the ultrasonic sensor 3 itself from the ultrasonic sensor 3 to the case 1 and at the same time to prevent the transmission of ultrasonic noises from the case 1 to the ultrasonic sensor 3. The elastic holder 2 has a cylinder part (elastic cylinder part) 31 to house the cylinder part 27 of the ultrasonic sensor 3 and to be housed in the cylindrical part 23 of the case 1. Then, the inside end of the cylinder part 31 of the elastic holder 2 has an opening 32 and a flange part (elastic end wall) 33 for regulating a position of the ultrasonic sensor 3.

At this point, many annular V-shaped grooves, 34 are formed on an inner peripheral surface of the cylinder part 31 of the elastic holder 2 to put the cylinder part 27 of the ultrasonic sensor 3 into a line contact with the cylinder part 31 of the elastic holder 2, whereby the cylinder part 27 of the ultrasonic sensor 3 is put into a slight contact at small areas with the cylinder part 31 of the elastic holder 2. Then, a retaining part (an elastic retaining part) 35 for retaining the outside end of the cylinder part 27 of the ultrasonic sensor 3 is annularly formed as a first elastic retaining part for retaining the ultrasonic sensor 3 on the outside end of the cylinder part 31 of the elastic holder 2 and hence the ultrasonic sensor 3 is held by the first elastic retaining part in such a way that it does not drop from the elastic holder 2.

Moreover, two pillar-shaped parts (elastic pillar-shaped parts) 36 are formed on a top surface of the flange part 33 of the elastic holder 2 in such a way that they are loosely passed through the suspending holes 26 of the case 1. A bulging part (elastic bulging part) 37 having an outside diameter a little larger than an inside diameter of the suspending hole 26 of the case 1 is annularly formed on the outer peripheral surface of the pillar-shaped part 36 of the elastic holder 2. The bulging part 37 of the elastic part 2 is passed through the suspending hole 26 of the case 1 while it is being compressed and when a position of the flange part 33 of the elastic part 2 is regulated by the bottom wall 24 of the case 1, it is exposed through the suspending hole 26 above the bottom wall 24 and at the same time it is restored by its elasticity to be retained by the bottom wall 24, whereby the elastic holder 2 is suspended by the bottom wall 24 of the case 1. Therefore, the pillar-shaped part 36 and the bulging part 37 are made as a second elastic retaining part for retaining the elastic holder 2 on the case 1.

When this tilt angle measuring apparatus is assembled, first, the cylinder part 27 of the ultrasonic sensor 3 is pressed into the cylinder part 31 of the elastic holder 2 while the leads 4, 5 are being passed through the opening 32 of the elastic holder 2. At this time, the cylinder part 27 of the ultrasonic sensor 3 is passed through the cylinder part 31 of the elastic holder 2 while it deforms the retaining part 35 of the elastic holder 2. Then, when the inside end of the cylinder part 27 of the ultrasonic sensor 3 abuts against the flange part 33 of the elastic holder 2, the outside end of the cylinder part 27 of the ultrasonic sensor 3 climbs over the retaining part 35 of the elastic holder 2, whereby the retaining part 35 of the elastic holder 2 is restored by its elasticity to retain the outside end of cylinder part 27 of the ultrasonic sensor 3.

Next, the leads 4, 5 of the ultrasonic sensors 3 which are held by the elastic holder 2 are passed through the through hole 25 of the case 1, and while the pillar-shaped parts 36 with the bulging part 37 of the elastic holder 2 are being pressed into the suspending holes 26 of the case 1, the cylinder part 31 of the elastic holder 2 is pressed into the cylindrical part 23 of the case 1. With this action, the flange part 33 of the elastic holder 2 is made to abut against the bottom wall 24 of the case 1, and at the same time, the bulging parts 37 of the elastic holder 2 are exposed above the bottom wall 24 of the case 1 and at the moment restored by its elasticity and retained by the bottom wall 24 of the case 1, whereby the elastic holder 2 is suspended by the bottom wall 24 of the case 1.

The tilt angle measuring apparatus assembled in the manner described above is mounted on a bottom of the vehicle in such a way that the vibrating part 28 of the ultrasonic sensor 3 faces downward. At this time, the ultrasonic sensor 3 tends to be moved by an action of gravity or its vibration but the retaining part 35 of the elastic holder 2 retains the outside end of the cylinder part 27 of the ultrasonic sensor 3, so that the ultrasonic sensor 3 will never be moved with respect to the elastic holder 2. Moreover, the elastic holder 2 tends also to be moved downward by an action of gravity or its vibration, but the bulging parts 37 of the elastic holder 2 are retained by the; bottom wall 24 of the case 1, so that the elastic holder 2 will never be moved with respect to the case 1.

In the tilt angle measuring apparatus mounted on the vehicle, the arithmetic and control circuit 14 sends an intermittent command to the transmitting circuit 11. Then, the transmitting circuit 11 generates pulses of a specific frequency according to the command from the arithmetic and control circuit and emits them to both of the ultrasonic sensors 3. The respective ultrasonic sensors 3 transmit ultrasonic waves A, B which have the same phase to the road surface R. The ultrasonic waves A, B are reflected by the road surface R and the ultrasonic waves C, D which are reflected by the road surface R are received by the ultrasonic sensors 3, respectively.

The ultrasonic sensors 3 having received the ultrasonic waves C, D convert them to electric signals of pulses with frequencies that correspond to the ultrasonic waves C, D and send them to the phase synchronization detecting circuit 13 via the receiving circuits 12a, 12b, respectively. The phase synchronization detecting circuit 13 compares the received waveforms of pulses of the frequency extracted from the receiving circuits 12a, 12b, respectively. Thus, when the vehicle is parallel to the road surface R, the ultrasonic sensors 3 receive the ultrasonic waves C, D at the same timing and hence the phases of the ultrasonic waves C, D are equal to each other. When the vehicle is tilted forward with respect to the road surface R, the front ultrasonic sensor 3 receives the reflected wave earlier than the rear ultrasonic sensor 3 and hence the ultrasonic wave C received by the front ultrasonic sensor 3 advances in the phase as compared with the ultrasonic wave D received by the rear ultrasonic sensor 3. Then, when the vehicle is tilted backward with respect to the road surface R, the front ultrasonic sensor 3 receives the reflected wave later than the rear ultrasonic sensor 3 and hence the ultrasonic wave C received by the front ultrasonic sensor 3 delays in the phase as compared with the ultrasonic wave D received by the rear ultrasonic sensor 3.

In this embodiment 1, the ultrasonic sensor 3 is pressed into the elastic-holder 2 and the elastic holder 2 holding the ultrasonic sensor 3 is only pressed into the case 1, so that it is possible to eliminate a need for providing such a forming process as is required in the related art and hence to improve workability in assembling. Moreover, the outside end of the cylinder part 27 of the ultrasonic sensor 3 is retained by the retaining part 35 of the elastic holder 2 and the bulging parts 37 of the elastic holder 2 are retained by the bottom wall 24 of the case 1, so that it is possible to surely hold the ultrasonic sensor 3 at a predetermined position even when the vibrating part 28 of the ultrasonic sensor 3 is faced downward.

At this time, the cylinder part 27 of the ultrasonic sensor 3 is put into contact with the cylinder part 31 of the elastic holder 2 via many V-shaped grooves 34 of the elastic holder 2, so that it is possible to prevent direct vibration from being transmitted from the cylinder part 27 of the ultrasonic sensor 3 to the cylinder part 31 of the elastic holder 2. Moreover, the pillar-shaped parts 36 of the elastic holder 2 are loosely passed through the suspending holes 26 of the case 1 and the bulging parts 37 of the elastic holder 2 are retained by the bottom wall 24 of the case 1, so that it is possible to prevent vibration from being transmitted between the pillar-shaped part 36 of the elastic holder 2 and the bottom wall 24 of the case 1.

Then, the flange part 33 is formed at the inside end of the cylinder part 31 of the elastic holder 2, so that it is possible to easily locate the ultrasonic sensor 3 with respect to the elastic holder 2. Further, the bottom wall 24 is formed at the inside end of the cylindrical part 23 of the case 1, so that it is possible to easily locate the elastic holder 2 with respect to the case 1. Still further, the suspending holes 26 and the pillar-shaped parts 36 are formed symmetrically with respect to the axis across the through hole 25, so that it is possible to easily assemble the elastic holder 2 in the case 1 only by rotating the elastic holder 2 so as to match the pillar-shaped parts 36 with the suspending holes. Still further, the retaining part 35 of the elastic holder 2 is formed in an annular shape, so that it is possible to retain the whole peripheral edge of the outside end of the cylinder part 27 of the ultrasonic sensor 3 and hence to stably retain the ultrasonic sensor 3.

At this point, while the ultrasonic wave utilizing device of the present invention has been applied to a tilt angle measuring apparatus of the vehicle in the above described embodiment, it is needless to say that it can be applied to an obstacle detecting apparatus and a backside monitoring apparatus. Further, while the angle of tilt has been determined by the phase difference in the above described embodiment, it is also needless to say that the angle of tilt can be determined by a time difference. Then, while the retaining part 35 of the elastic holder 2,has been formed annularly in the above described embodiment, when it is composed of a plurality of protruding members in consideration of weight of the ultrasonic sensor 3, it is possible to easily insert the ultrasonic sensor 3 into the elastic holder 2 and further to save a material cost. Still further, while the ultrasonic wave transmitting/receiving device has been described as the ultrasonic wave utilizing device in the above description, it is also recommended that ultrasonic wave transmitting/receiving device be separately composed of an ultrasonic wave transmitting device for transmitting the ultrasonic wave and an ultrasonic wave receiving device for receiving the ultrasonic wave that is separated from the ultrasonic wave transmitting device.

What is claimed is:

1. An ultrasonic wave utilizing device comprising:
   a cylindrical elastic holder into which an ultrasonic sensor is pressed; and
   a cylindrical part that is closed at one end and is formed in a case in such a way as to have the elastic holder assembled therein, characterized in that
   the elastic holder has an elastic end wall, and a first elastic retaining part for retaining an outside end edge of the ultrasonic sensor which is pressed into the elastic holder, wherein the elastic holder has a second elastic retaining part retained by the case on the elastic end wall, and the second elastic retaining part has an elastic pillar-shaped part that is passed through a hole formed in a bottom of the cylindrical part and an elastic bulging part that is formed on the elastic pillar-shaped part in a manner bulging in a radial direction such that it is passed through the hole and then retained by an edge of the hole.

2. The ultrasonic wave utilizing device as claimed in claim 1, wherein the first elastic retaining part is disposed at the outside end edge of the ultrasonic sensor.

3. The ultrasonic wave utilizing device as claimed in claim 2, wherein the first elastic retaining part is disposed at an open end of the elastic holder.

4. The ultrasonic wave utilizing device as claimed in claim 1, wherein the second elastic retaining part has an elastic pillar-shaped part that is passed through a hole formed in a bottom of the cylindrical part.

5. The ultrasonic wave utilizing device as claimed in claim 4, wherein the elastic pillar-shaped part projects out from the elastic end wall of the elastic holder.

6. An ultrasonic wave utilizing device comprising:
a cylindrical elastic holder into which an ultrasonic sensor is pressed; and
a cylindrical part that is closed at one end and is formed in a case in such a way as to have the elastic holder assembled therein, characterized in that
the elastic holder has an elastic end wall, and a first elastic retaining part for retaining an outside end edge of the ultrasonic sensor which is pressed into the elastic holder,
wherein the ultrasonic sensor and the elastic holder are substantially coaxially disposed along an axis and a radial dimension from the axis to an inner edge of the first elastic retaining part is less than a radial dimension from the axis to the outside end edge of the ultrasonic sensor.

* * * * *